United States Patent
Tan et al.

(10) Patent No.: US 8,433,873 B2
(45) Date of Patent: Apr. 30, 2013

(54) DISPOSITION INSTRUCTIONS FOR EXTENDED ACCESS COMMANDS

(75) Inventors: Cheng P. Tan, Fremont, CA (US); Khalu C. Bazzani, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 252 days.

(21) Appl. No.: 12/854,653

(22) Filed: Aug. 11, 2010

(65) Prior Publication Data

US 2011/0219206 A1 Sep. 8, 2011

Related U.S. Application Data

(60) Provisional application No. 61/310,656, filed on Mar. 4, 2010.

(51) Int. Cl.
*G06F 12/14* (2006.01)

(52) U.S. Cl.
USPC ........... 711/165; 711/118; 711/161; 711/162; 710/4; 709/217

(58) Field of Classification Search ........... 711/165, 711/118, 161, 162; 710/4; 709/217
See application file for complete search history.

(56) References Cited

U.S. PATENT DOCUMENTS

| 5,473,765 | A | * | 12/1995 | Gibbons et al. | 703/24 |
|---|---|---|---|---|---|
| 5,506,986 | A | | 4/1996 | Healy | |
| 5,794,244 | A | | 8/1998 | Brosch | |
| 6,678,752 | B1 | | 1/2004 | Ashton | |
| 7,092,977 | B2 | | 8/2006 | Leung | |
| 7,979,614 | B1 | * | 7/2011 | Yang | 710/74 |
| 2005/0060444 | A1 | * | 3/2005 | Lum | 710/36 |
| 2007/0174546 | A1 | * | 7/2007 | Lee | 711/113 |
| 2009/0089590 | A1 | * | 4/2009 | Challener et al. | 713/193 |
| 2009/0157756 | A1 | | 6/2009 | Sanvido | |
| 2009/0228669 | A1 | | 9/2009 | Slesarev | |

* cited by examiner

*Primary Examiner* — Jae Yu
(74) *Attorney, Agent, or Firm* — Womble Carlyle Sandridge & Rice LLP

(57) ABSTRACT

A computer system that generates a disposition instruction and an associated access command directed to a block of data at a logical address is described. The disposition instruction and the access command are communicated to a memory system in the computer system via a communication link. Note that the memory system includes different types of memory having different performance characteristics, and the disposition instruction is generated based on the different performance characteristics. In response to the access command, the memory system accesses the block of data at the logical address in a first type of memory in the different types of memory. Furthermore, based on the disposition instruction, the memory system moves the block of data to a second type of memory in the different types of memory to facilitate subsequent accesses to the block of data.

22 Claims, 7 Drawing Sheets

DISPOSITION INSTRUCTIONS FOR EXTENDED ACCESS COMMANDS

CROSS REFERENCE TO RELATED APPLICATIONS

This application claims priority under 35 U.S.C. 119(e) to U.S. Provisional Application Ser. No. 61/310,656, entitled "Disposition Instructions for Extended Access Commands," by Cheng P. Tan and Khalu C. Bazzani, filed on Mar. 4, 2010, and having attorney reference number APL-P9130USP1, the contents of which are herein incorporated by reference.

BACKGROUND

1. Field

The present disclosure relates to a system that includes different types of memory having different performance characteristics. More specifically, the present disclosure relates to a system that migrates a block of data among the different types of memory based on a disposition instruction for an access command directed to the block of data.

2. Related Art

Data storage in a computer system typically involve different types of memory and storage devices, such as: static random access memory (SRAM), dynamic random access memory (DRAM), flash memory, a hard disk drive (HDD), an optical disk drive, a tape drive and/or a solid state drive (SSD). Furthermore, software modules within an operating system, which are associated with the different types of memory, are often used to implement a data-storage management system that can handle data demands from the user or an application, as well as from the operating system.

The performance characteristics of the different types of memory can have a strong impact on the overall performance of many computer systems. For example, the input/output (I/O) performance of a computer system can be adversely affected by the I/O performance of HDDs. While an HDD can provide a cost-effective storage solution, from an I/O performance perspective it is often a weak link in a computer system, especially when small blocks of fragmented data are transferred between the HDD and the computer system. Moreover, HDDs are often afflicted by environmental conditions, such as temperature, vibration and/or shock, especially in portable systems. Additionally, an idling HDD can be a major source of power consumption.

In principle, the performance characteristics of other types of memory can be used to offset or mitigate the problems associated with HDDs. However, selecting the appropriate configuration or disposition of one or more blocks of data among the types of memory can be challenging because there are typically tradeoffs in the performance characteristics of the different types of memory. For example, while SSDs have improved I/O performance relative to HDDs, the cost of SSDs, which can be an order of magnitude larger per Gigabyte than HDDs, can be prohibitive. In addition, flash memory (such as NAND flash memory) in SSDs typically has a limited number of available programmable cycles.

Hence, what is needed is a technique for accessing a block of data that overcomes the problems listed above.

SUMMARY

One embodiment of the present disclosure relates to a computer system that includes first control logic that generates a disposition instruction associated with an access command directed to a block of data at a logical address. The disposition instruction and the access command are communicated to a memory system via a communication link. Note that the memory system includes different types of memory having different performance characteristics, and the disposition instruction is generated based on the different performance characteristics. Moreover, second control logic in the memory system receives the access command and, in response to the access command, accesses the block of data at the logical address in a first type of memory in the different types of memory. Furthermore, based on the disposition instruction, the second control logic moves the block of data to a second type of memory in the different types of memory to facilitate subsequent accesses to the block of data.

Note that the access command may include a read command or a write command. Furthermore, the different performance characteristics may include: differing power consumptions of the different types of memory and/or different data rates of the different types of memory.

In some embodiments, the disposition instruction is generated based on: characteristics of a file system in the computer system, a power state of the computer system, and/or characteristics of an application executed by the computer system. Additionally, the disposition instruction may instruct the second control logic to move the block of data to the second type of memory. Alternatively, the disposition instruction may suggest that the second control logic move the block of data to the second type of memory. Note that the disposition instruction may be included in the access command and/or may be interleaved between access commands that are communicated on the communication link.

Moreover, the memory system may provide: storage-utilization information for the different types of memory to the computer system and/or disposition information for the block of data to the computer system.

Another embodiment provides the memory controller, which may be used in the memory system. During operating, an interface circuit in the memory controller may receive the disposition instruction and the access command directed to the block of data at the logical address in the memory system managed by the memory controller. In response to the access command, third control logic in the memory controller may forward the access command to the first type of memory. Moreover, in response to the disposition instruction, the third control logic may move the block of data to the second type of memory to facilitate the subsequent accesses to the block of data by providing a read command for the block of data to the first type of memory and a write command for the block of data to the second type of memory.

Another embodiment provides a method for moving a block of data. During this method, the disposition instruction and the access command directed to the block of data at the logical address in the first type of memory in different types of memory is received. Then, in response to the access command, the block of data at the logical address is accessed by forwarding the access command to the first type of memory. Furthermore, in response to the disposition instruction, the block of data is moved to the second type of memory in the different types of memory to facilitate the subsequent accesses to the block of data by providing the read command for the block of data to the first type of memory and the write command for the block of data to the second type of memory.

Another embodiment provides a variation on the computer system in which the first control logic generates a disposition instruction and subsequent access commands directed to blocks of data at logical addresses. This disposition instruction is based on the different performance characteristics of the different types of memory and a global parameter of the memory system or the computer system. The disposition instruction and the access command are communicated to the memory system via the communication link. In response to the disposition instruction, the second control logic moves the blocks of data to a type of memory in the different types of memory if copies of the blocks of data are not already stored on the type of memory. For example, the blocks of data may be moved from a first type of memory to a second type of memory. Furthermore, in response to the subsequent access commands, the second control logic accesses the blocks of data at the logical addresses in the type of memory, such as the second type of memory.

Note that the global parameter may include: a power state of the computer system, performance of the computer system and/or data availability in the computer system.

Similarly, another embodiment provides a variation on the memory controller in which the interface circuit receives the disposition instruction and the subsequent access commands. In response to the disposition instruction, the third control logic may move the blocks of data to the type of memory in the different types of memory if the copies of the blocks of data are not already stored on the type of memory. Furthermore, the third control logic may access the blocks of data at the logical addresses in the type of memory in response to the subsequent access commands.

Figure 1:
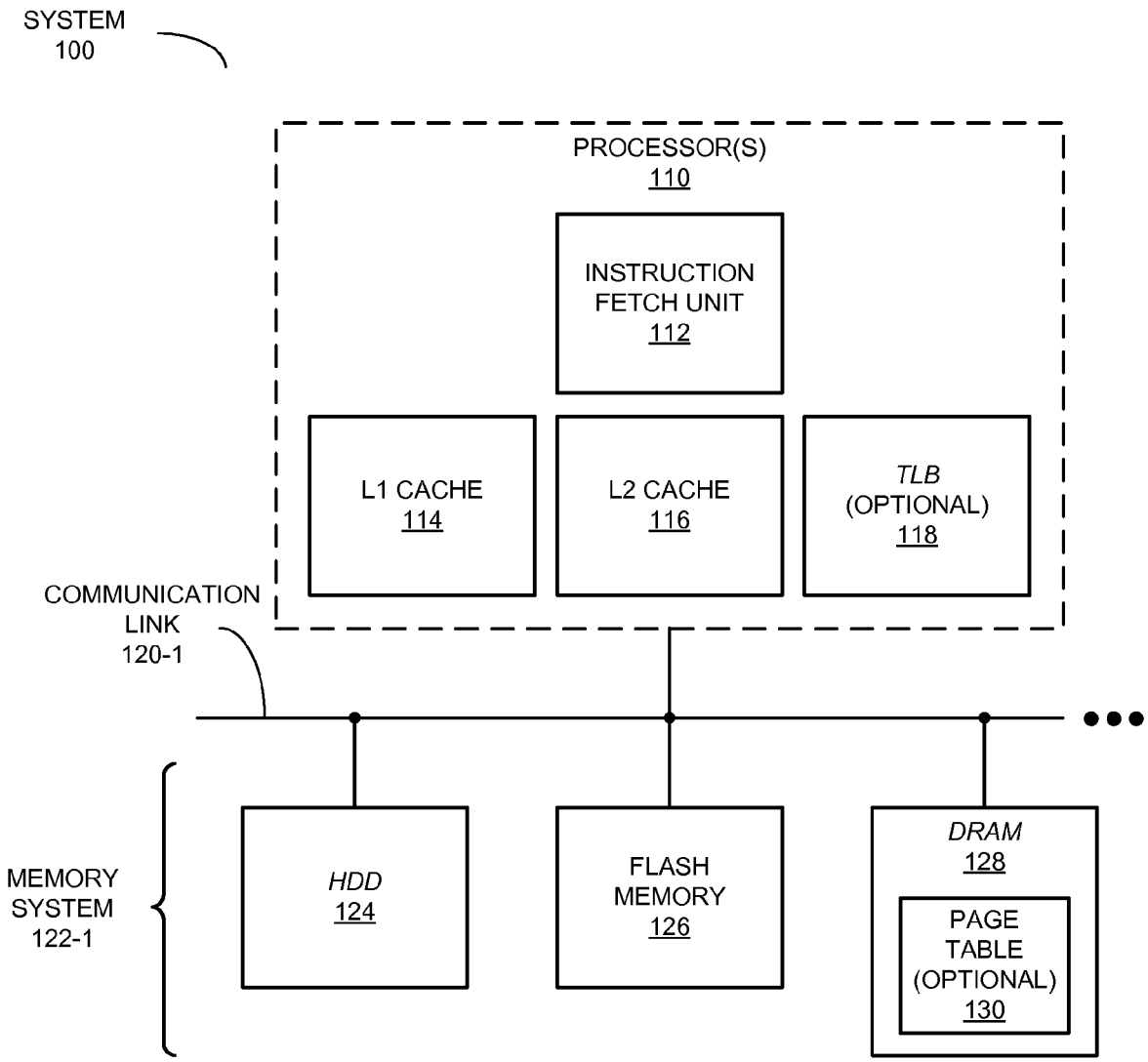
FIG. 1 is a block diagram of a system that includes different types of memory having different performance characteristics in accordance with an embodiment of the present disclosure.
Figure 2:
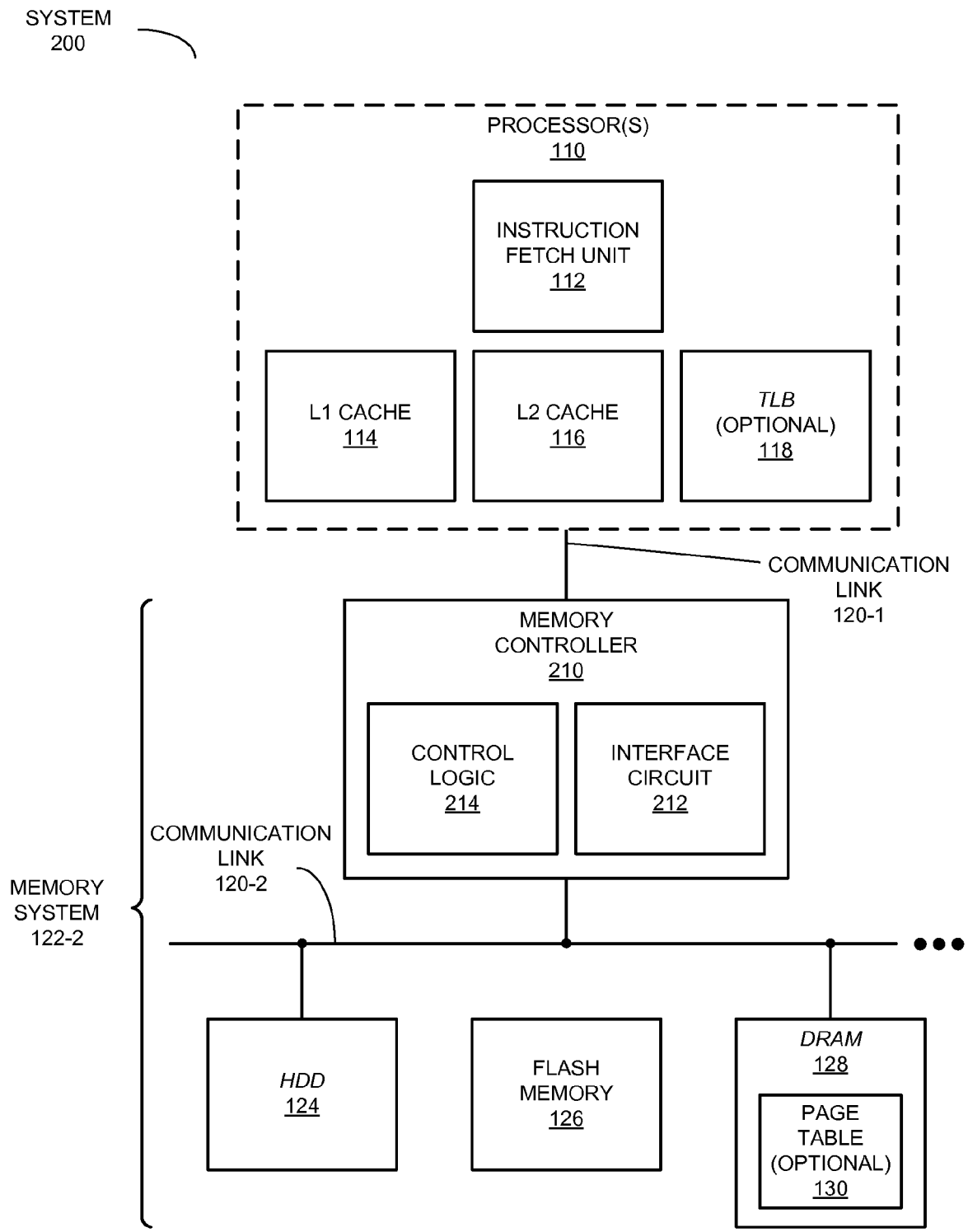
FIG. 2 is a block diagram of a system that includes different types of memory having different performance characteristics in accordance with an embodiment of the present disclosure.

Table 1 provides an example of possible data migrations between types of memory in the memory system in the system of FIG. 1 or the system of FIG. 2 in response to disposition instructions in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of a computer system, a memory controller and a method for moving a block of data are described. This computer system generates a disposition instruction and an associated access command directed to a block of data at a logical address. The disposition instruction and the access command are communicated to a memory system in the computer system via a communication link. Note that the memory system includes different types of memory having different performance characteristics, and the disposition instruction is generated based on the different performance characteristics. In response to the access command, the memory system accesses the block of data at the logical address in a first type of memory in the different types of memory. Furthermore, based on the disposition instruction, the memory system moves the block of data to a second type of memory in the different types of memory to facilitate subsequent accesses to the block of data.

In this way, the disposition instruction can be used to modify or select the overall performance (and, more generally, a characteristic) of the memory system and/or the computer system during subsequent accesses to the block of data. For example, the second type of memory may have lower power consumption than the first type of memory and, in the event of a low battery power in the computer system, the disposition instruction may ensure that subsequent accesses to the block of data have reduced power consumption. Alternatively or additionally, the second type of memory may have a higher data rate than the first type of memory and, based on characteristics of an application executed by the computer system, the disposition instruction may ensure that subsequent accesses to the block of data are fast.

Figure 7:
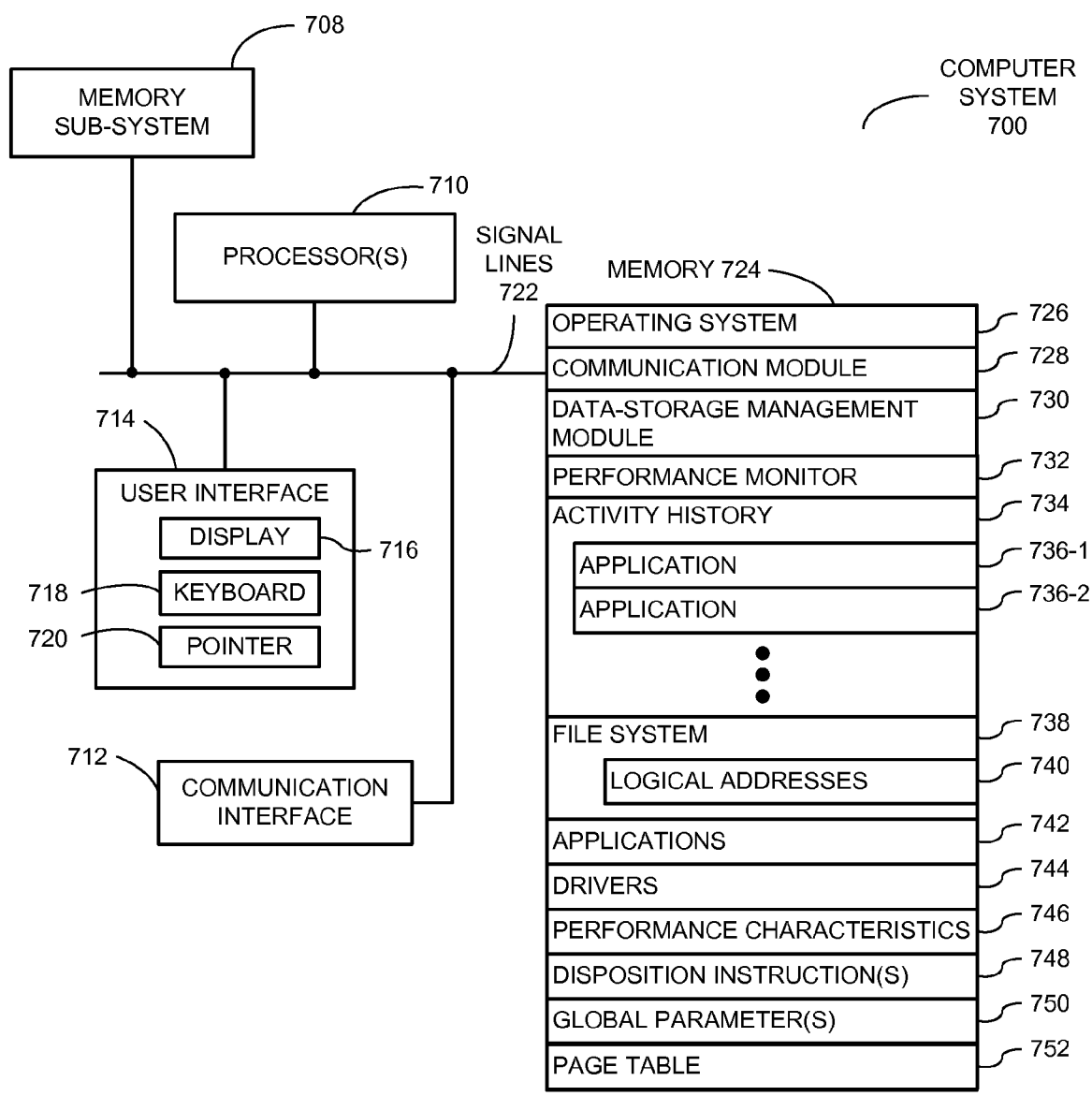
FIG. 7 is a block diagram of a computer system, which may include the system of FIG. 1 or the system of FIG. 2, in accordance with an embodiment of the present disclosure.

We now describe embodiments of a system, such as computer system 700 (FIG. 7). FIG. 1 presents a block diagram of a system 100 that includes different types of memory having different performance characteristics. In this system, an instruction fetch unit 112 (and, more generally, control logic) in one or more processors 110 fetches (for example, from L1 cache 114 and/or L2 cache 116) and executes instructions for generating a disposition instruction for an access command directed to a block of data at a logical address. As described further below, these generating instructions may be associated with a characteristics of a file system that manages the disposition of a block of data (e.g., where the block of data is stored) in the different types of memory based on the different performance characteristics (thus, the disposition instruction may be based on the different performance characteristics).

Then, the disposition instruction and the access command are communicated to the types of memory in a memory system 122-1 via a communication link 120-1. Note that communication link 120-1 may include: a serial ATA (SATA) interface, a Small Computer System Interface (SCSI) or a Serial Attached SCSI (SAS). In general, memory system 122-1 can include various types of memory, including a high-capacity, long-access-time storage device or mass-storage component, as well as lower-capacity, smaller-access-time storage devices (or mass-storage components). In the discussion that follows, HDD 124 is used as an illustration of the high-capacity, long-access-time storage device, and flash memory 126 (such as NAND flash memory) and DRAM 128 are used as illustrations of the lower-capacity, smaller-access-time storage devices. However, in other embodiments a variety of non-volatile and/or volatile storage devices can be used in system 100. In addition, in some embodiments memory system 122-1 includes a hybrid storage device that includes multiple cooperating mass-storage components within a standard form factor, such as an HDD and flash memory in a standard 2.5" enclosure (i.e., the hybrid storage device may include different types of memory).

In response to the access command, a first type of memory in the different types of memory (such as HDD 124) in memory system 122-1 accesses the block of data at the logical address. For example, the access command may include a read command from or a write command to the logical address. Note that a type of memory may include one or more memory devices (such as one or more HDDs) or one or more groups of storage cells (such as in flash memory or DRAM).

Furthermore, based on the disposition instruction, the block of data may be moved to a second type of memory in the different types of memory (such as flash memory 126) to facilitate subsequent accesses to the block of data. For example, the disposition instruction may be generated based on: the relative data rates of HDD 124 and flash memory 126, information in a file system (such as a logical address in the address space) that indicates that the block of data is stored on HDD 124, and/or information that indicates that the block of data will be used routinely in the near future (such as when the block of data includes fonts that will be used with an application that is being executed by one or more processors 110). (More generally, the disposition instruction may be based on characteristics of one or more applications that are being executed by system 100, such as previously monitored performance of an application or blocks of data that are associated with core services provided by an operating system for the application.) Consequently, in this case the disposition instruction may instruct HDD 124 to read (and, then, erase) the block of data, and may instruct flash memory 126 to subsequently write the block of data (for example, to a group of sixteen flash memory cells). (In addition, the address space associated with the file system in system 100 may be remapped so that the logical address for the block of data is on the second type of memory.) In this way, the disposition instruction may ensure short access time during the subsequent accesses, i.e., high performance.

Alternatively or additionally, the disposition instruction may be generated based on: the relative power consumption of HDD 124 and flash memory 126 and/or information in a file system (such as a logical address in the address space) that indicates that the block of data is stored on HDD 124. Consequently, in this case the disposition instruction may instruct HDD 124 to read (and, then, erase) the block of data and to transition to a low-power operating mode (for example, HDD 124 may be turned off), and may instruct flash memory 126 to subsequently write the block of data. In this way, the disposition instruction may ensure low-power consumption during the subsequent accesses.

In another example, system 100 is aware of the I/O payload content when a data transfer request is made between system 100 and a target type of memory. Consequently, an I/O payload can be further described and categorized based on: usage characteristics (such as the data reuse probability and frequency), data payload size or type, useful life/time of the data, and/or any other relevant characteristics. In conjunction with the performance characteristics of the different types of memory, these I/O payload classifications can be used to generate the disposition instruction, which allows system 100 to specify the best location (i.e., which type of memory) in which to store or retrieve the data regardless of the topology or architecture of memory system 122-1. Therefore, the disposition instruction may direct data transfer requests to a specific type of memory, or even a specific memory device or group of storage cells. Note that, in embodiments that include a hybrid storage device, such data migration may occur among the types of memory in the hybrid storage device in response to the disposition instruction.

In other exemplary embodiments, the disposition instruction can be used to select or obtain one or more specific characteristics, such as minimizing usage of HDD 124, minimizing the spinning time of HDD 124 (to reduce power consumption or to improve reliability), maximizing a data rate or the I/O transfer rate, increasing data redundancy (and, thus, increasing data availability), minimizing overall power usage, improving operating-system efficiency and/or improving file-system I/O efficiency.

Thus, the disposition instruction may facilitate data retention and data flows in memory system 122-1 (and, more generally, data management policies) that allow the performance or the characteristics of memory system 122-1 and/or system 100 to be selected or adjusted (for example, high performance or low power consumption) based on the different performance characteristics of the different types of memory. In other words, this performance-characteristic-aware storage-management technique (which leverages knowledge or awareness of the performance characteristics of the different types of memory in the file system and the hardware/software drivers of the operating system) may allow the characteristics of memory system 122-1 and/or system 100 (such as, access time, power consumption and/or data availability) to be dynamically modified by moving data through a memory hierarchy in memory system 122-1 to obtain a desired synthesized characteristic.

In the preceding discussion, a move operation was used as an illustrative example of the disposition instruction. However, in other embodiments, the disposition instruction may perform a copy operation, in which data is stored on two different types of memory in memory system 122-1. In these embodiments, there may be a pointer in the address space to two or more memory devices for the same logical address.

In order to facilitate generation of the disposition instruction by the one or more processors 110, the file system in system 100 may maintain some information about memory system 122-1. In particular, in response to the disposition instruction and/or the access command, memory system 122-1 may provide storage-utilization information for the different types of memory to the computer system, such as information that indicates utilization (or available memory) of the types of memory and/or any internal partitions in memory system 122-1. However, in some embodiments memory system 122-1 provides detailed disposition information to the file system. For example, memory system 122-1 may provide information that specifies the location of the block of data after it has been moved to the second type of memory. This detailed disposition information may allow the file system to select a desired characteristic or to optimize the data configuration in the types of memory to obtain based on one or more constraints.

Consequently, there may be a range of functionality in system 100 (and in the subsequent embodiments) ranging from: a disposition instruction that is generated without a priori knowledge of the disposition of the data in memory system 122-1, to a disposition instruction that is generated with knowledge of the utilization of the types of memory, to a disposition instruction that is generated with detailed knowledge of the disposition of the data in memory system 122-1.

In some embodiments, the detailed knowledge of the disposition of the data in memory system 122-1 (i.e., where the data is located) may be included in optional page table 130 (which may be stored in DRAM 128 or flash memory 126) for different threads and/or optional translation lookaside buffer (TLB) 118 (which may be in the one or more processors 110 or between the one or more processors 110 and DRAM 128, and which may act as a cache for larger page table 130). Note that either TLB 118 or page table 130 may convert virtual addresses in the address space associated with the file system into physical addresses.

While the preceding discussion illustrated the disposition instruction as including a command to move or copy the block of data, in other embodiments the disposition instruction may include a suggestion to move or copy the block of data. This may give the types of memory in memory system 122-1 the option to perform the move or copy operation later (such as within a specified time interval) or not to perform the move or copy operation at all (such as when the second type of memory is full or unavailable). This flexibility may be useful in embodiments where the file system does not have utilization information or detailed a priori information about the data disposition before generating the disposition instruction or, as described below, where one or more processors 110 do not perform the function of a memory controller for memory system 122-1.

In system 100, the memory controller for memory system 122-1 is implemented by one or more processors 110 and/or in the operating system, such as in systems where the types of memory are on a motherboard. Consequently, the detailed disposition of data in memory system 122-1 is transparent to the operating system, i.e., memory system 122-1 is not a 'black box' to the rest of system 100. However, in other embodiments, the memory system includes a memory controller that is separate from the operating system, i.e., the details of the memory system may be a 'black box' to the rest of the system. This is illustrated in FIG. 2, which presents a block diagram of a system 200 that includes different types of memory having different performance characteristics.

In system 200, the disposition instruction generated by the one or more processors 110 may direct memory controller 210 to perform data management, for example, to move or copy the block of data from the first type of memory to the second type of memory. In particular, an interface circuit 212 in memory controller 210 may receive the disposition instruction and the access command. In response to the access command, control logic 214 in memory controller 210 may forward the access command to the first type of memory (such as HDD 124) using communication link 120-2. In addition, in response to the disposition instruction, control logic 214 may move the block of data to the second type of memory (such as flash memory 126) using communication link 120-2 to facilitate the subsequent accesses to the block of data by providing a read command for the block of data to the first type of memory and a write command for the block of data to the second type of memory.

While the preceding embodiments illustrate a disposition instruction that is associated with a specific access command, in other embodiments a disposition instruction may be generated to select or modify one or more characteristics of either of memory systems 122, system 100 (FIG. 1) and/or system 200 for multiple subsequent access commands that are directed to blocks of data at logical addresses, i.e., the disposition instruction may modify the data storage and management in either of memory systems 122 for a time interval that encompasses multiple access commands directed to blocks of data at logical addresses. For example, the disposition instruction may be generated based on the different performance characteristics of the different types of memory and a global parameter of either of memory systems 122, system 100 (FIG. 1) and/or system 200. In response to the disposition instruction, a given memory system may move the blocks of data to a type of memory in the different types of memory if copies of the blocks of data are not already stored on the type of memory. Furthermore, in response to the subsequent access commands, a given one of memory systems 122 accesses the blocks of data at the logical addresses in the type of memory. In this way, the disposition instruction may help define or specify an operating mode, which has one or more associated characteristics (such as low power, high I/O performance or high data availability), for either of memory systems 122, system 100 (FIG. 1) and/or system 200.

In an exemplary embodiment, the one or more characteristics can tailor the power and/or performance of either of memory systems 122, system 100 (FIG. 1) and/or system 200 for mobile versus desktop environments. Thus, the global parameter may include a power state of system 100 (FIG. 1) or 200, such as when the stored energy in a battery is running low. Alternatively or additionally, the global parameter may include the I/O performance of an application, and the disposition instruction may ensure that the blocks of data can be accessed on the type of memory with a high data rate and a low access time, and/or that the blocks of data have high availability (such as multiple copies in either of memory systems 122).

Table 1 provides an example of possible data migrations between types of memory in either of memory systems 122 in response to disposition instructions in system 100 (FIG. 1) or system 200 (FIG. 2). Note that Table 1 is not intended to be an all-encompassing list, for example, disposition instructions may be combined or there may be special instructions, such as turn off HDD, etc. Furthermore, in some embodiments flash memory is dynamically partitioned for use: by an internal device, as a read cache, and/or during a write command. In these embodiments, a special command may be used to independently or concurrently change power states of the flash memory and the HDD.

TABLE 1

| Data Migration | Comment |
| --- | --- |
| Write command from operating system (OS) to DRAM | Future reads at logical address from DRAM |
| Write command from OS to DRAM to flash memory | Future reads at logical address from DRAM until DRAM is cleared |
| Write command from OS to DRAM to flash memory to HDD | Future reads at logical address from DRAM until DRAM is cleared, then from flash memory until written to HDD and the flash-memory cells are repurposed |
| Write command from OS to flash memory | Future reads at logical address from flash memory |

TABLE 1-continued

| Data Migration | Comment |
| --- | --- |
| Write command from OS to flash memory to HDD | Future reads at logical address from flash memory until written to HDD and the flash-memory cells are repurposed |
| Write command from OS to HDD | A standard write command |
| Read command from flash memory to DRAM to OS | Future reads at logical address from DRAM until DRAM is cleared |
| Read command from HDD to flash memory to OS | Future reads at logical address from flash memory until the flash-memory cells are repurposed |
| Read command from HDD to DRAM to OS | Future reads at logical address from DRAM until cleared |
| Read command from HDD to flash memory to DRAM to OS | Future reads at logical address from DRAM until cleared, then from flash memory until flash-memory cells are repurposed |
| Read command from HDD to OS | A standard read command |

Note that cache-clearing techniques for DRAM and/or flash memory may be configured so that they do not interfere with the data storage and migration in the storage-management technique. Consequently, in some embodiments there may be special commands in the disposition instructions that manage the caching technique, such as: a time-to-live argument for the special commands and/or a special command to clear all or part of the cache. Furthermore, any of the special commands may return an error status if a pass-through type of memory was too full, i.e., had insufficient available space for the block(s) of data.

Figure 3:
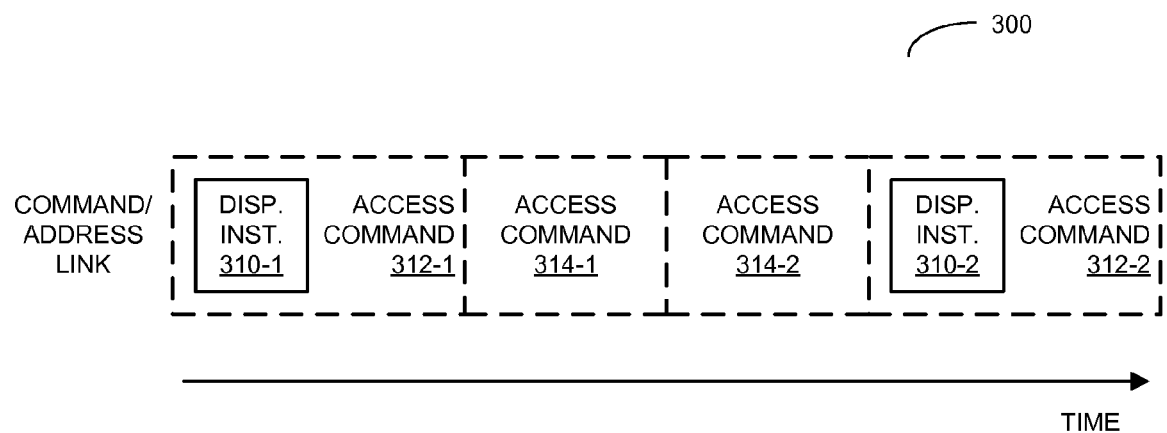
FIG. 3 is a timing diagram that illustrates commands on a communication link in the system of FIG. 1 or the system of FIG. 2 in accordance with an embodiment of the present disclosure.
Figure 4:
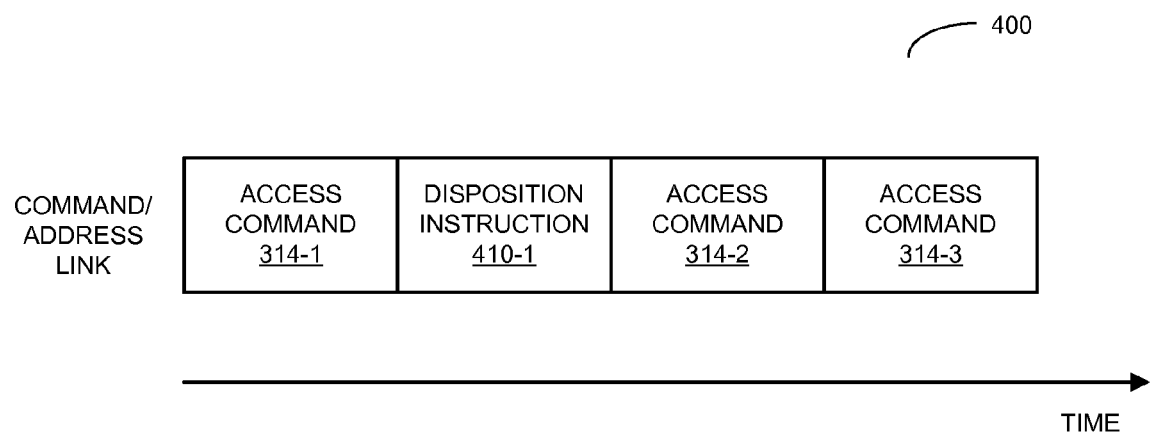
FIG. 4 is a timing diagram that illustrates commands on a communication link in the system of FIG. 1 or the system of FIG. 2 in accordance with an embodiment of the present disclosure.

A variety of techniques and configurations may be used to convey or communicate one or more disposition instructions to memory systems 122 in FIGS. 1 and 2. For example, as shown in FIG. 3, which presents a timing diagram 300 that illustrates commands on a communication link (such as a command/address link) in system 100 (FIG. 1) or system 200 (FIG. 2), disposition instructions 310 may be included in access commands 312 (which are sometimes referred to as 'extended access commands,' while other access commands 314 may not include disposition instructions. Alternatively, as shown in FIG. 4, which presents a timing diagram 400 that illustrates commands on a communication link (such as a command/address link) in system 100 (FIG. 1) or system 200 (FIG. 2), disposition instructions (such as disposition instruction 410-1) may be interleaved between access commands (such as access commands 314-1 and 314-2).

Figure 5:
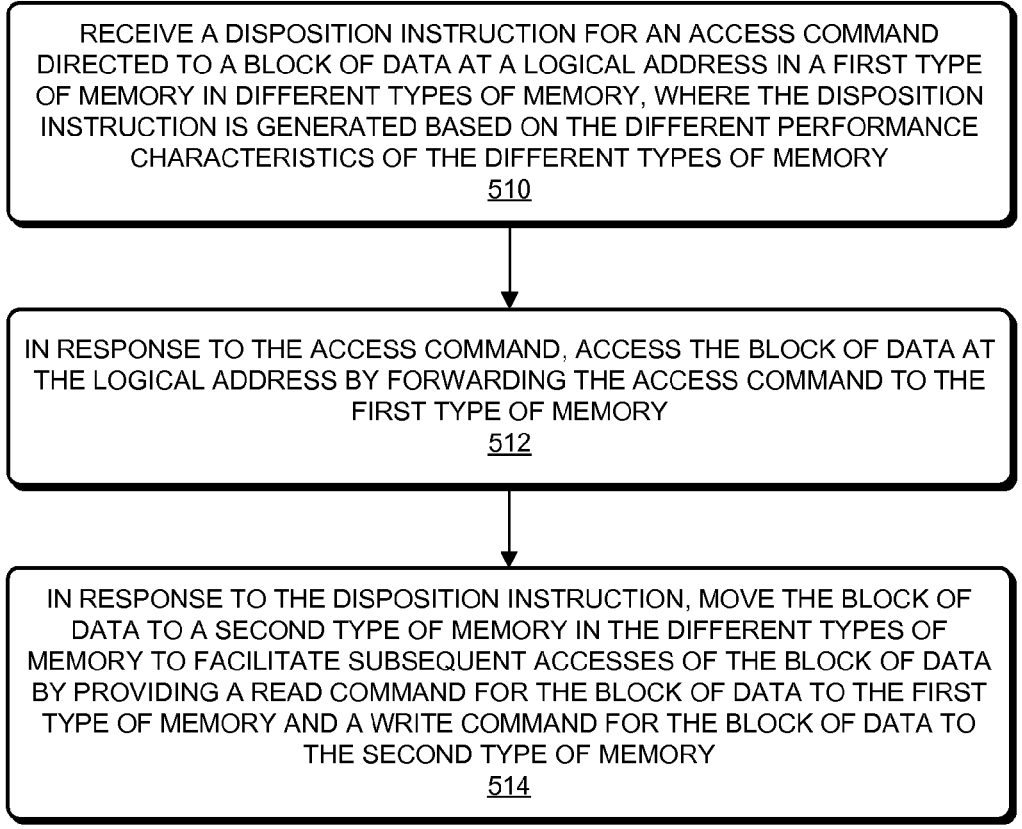
FIG. 5 is a flow diagram of a method for moving a block of data in the system of FIG. 1 or the system of FIG. 2 in accordance with an embodiment of the present disclosure.

We now describe embodiments of a storage-management technique. FIG. 5 presents a flow diagram of a method 500 for moving a block of data in system 100 (FIG. 1) or system 200 (FIG. 2). During this method, a disposition instruction for an access command directed to the block of data at a logical address in a first type of memory in different types of memory is received (operation 510), where the disposition instruction is generated based on the different performance characteristics of the different types of memory. Then, in response to the access command, the block of data at the logical address is accessed by forwarding the access command to the first type of memory (operation 512). Furthermore, in response to the disposition instruction, the block of data is moved to a second type of memory in the different types of memory to facilitate subsequent accesses to the block of data by providing a read command for the block of data to the first type of memory and a write command for the block of data to the second type of memory (operation 514).

Figure 6:
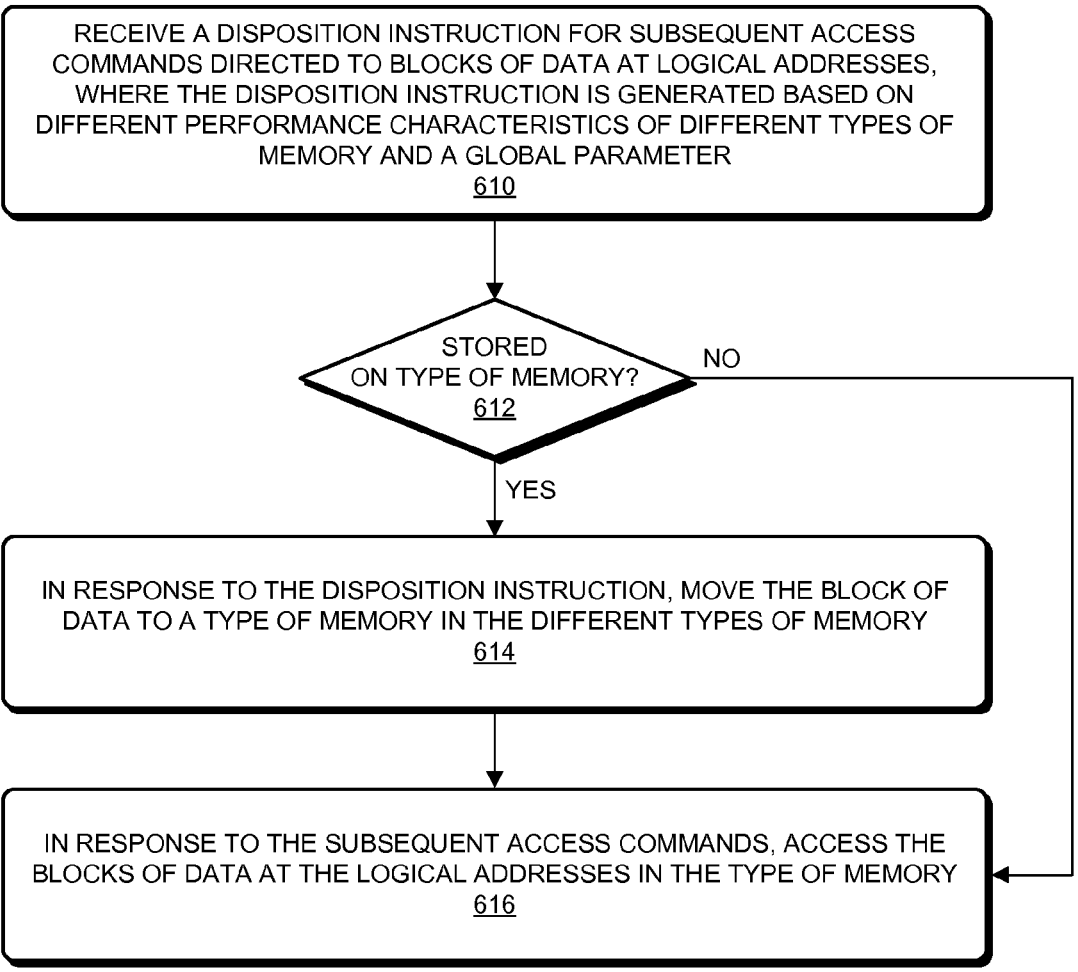
FIG. 6 is a flow diagram of a method for moving a block of data in the system of FIG. 1 or the system of FIG. 2 in accordance with an embodiment of the present disclosure.

The variation on the storage-management technique in which the disposition instruction is also based on a global parameter is shown in FIG. 6, which presents a flow diagram of a method 600 for moving blocks of data in system 100 (FIG. 1) or system 200 (FIG. 2). During this method, a disposition instruction for subsequent access commands directed to the blocks of data at logical addresses is received (operation 610). Note that the disposition instruction is generated based on the different performance characteristics of different types of memory and the global parameter of the memory system or the system. Then, if the copies of the blocks of data are not already stored on the type of memory (operation 612), the blocks of data at the logical addresses are moved to a type of memory in the different types of memory in response to the disposition instruction (operation 614). Moreover, in response to the subsequent access commands, the blocks of data at the logical addresses in the type of memory may be accessed (operation 616).

In some embodiments of methods 500 (FIG. 5) and/or 600, there may be additional or fewer operations. Moreover, the order of the operations may be changed and/or two or more operations may be combined into a single operation.

We now describe embodiments of the computer system. FIG. 7 presents a block diagram of a computer system 700, which may include system 100 (FIG. 1) or system 200 (FIG. 2). This computer system includes: one or more processors 710 (or processor cores or elements, and more generally a means for computing), communication interface 712, a user interface 714, and one or more signal lines 722 coupling these components together. Note that the one or more processors 710 may support parallel processing and/or multi-threaded operation, the communication interface 712 may have a persistent communication connection, and the one or more signal lines 722 may constitute a communication link or a communication bus. Moreover, the user interface 714 may include: a display 716, a keyboard 718, and/or a pointer 720, such as a mouse.

In this discussion, a 'computer' or 'computer system' includes one or more electronic devices that are capable of manipulating computer-readable data or communicating such data between two or more computer systems over a network, including: a personal computer, a laptop computer, a mainframe computer, a server, a work station, a portable computing device or a portable electronic device (such as a cellular phone or personal digital assistant that a user can readily carry or move from one location to the next), a personal organizer, a client computer (in a client-server architecture), a digital signal processor, a game console, an MP3 player, a device controller, and/or a computational engine within an appliance. Furthermore, a 'keyboard' includes a user interface device (or, more generally, an input device) with physical or virtual keys (such as on a touch-sensitive display) that a user can activate by moving one or more digits to provide alphanumeric information. Additionally, a 'mouse' includes a user interface device (or, more generally, an input device) that a user can move or manipulate (for example, by moving their hand or by clicking on a button) to move a cursor (or, more generally, an icon on a display where characters can be entered, corrected or deleted) or to select an object (such as displayed text). Note that a 'display' may include a wide variety of devices that can present information or receive user instructions, including: a cathode ray tube, a liquid-crystal display, a light-emitting-diode display, a projection display, a touch-sensitive display (or touch screen), a flexible display (such as a polymer display), an organic light-emitting-diode display, an electronic-ink display, etc.

Memory 724 in the computer system 700 may include volatile memory and/or non-volatile memory that are configured to store information. More specifically, memory 724 may include: ROM, RAM, EPROM, EEPROM, flash memory, one or more smart cards, one or more magnetic disc storage devices, magnetic tape, one or more optical storage devices, and/or other media capable of storing code and/or data now known or later developed. Memory 724 may store an operating system 726 that includes procedures (or a set of instructions) for handling various basic system services for performing hardware-dependent tasks. While not explicitly indicated in computer system 700, in some embodiments operating system 726 includes a web browser, such as: Internet Explorer™ (from Microsoft Corporation, of Redmond, Wash.), Safari™ (from Apple Inc., of Cupertino, California), and/or Firefox (from the Mozilla Foundation, of Mountain View, Calif.). Additionally, memory 724 may store procedures (or a set of instructions) in a communication module 728. These communication procedures may be used for communicating with memory system 708, as well as one or more computers and/or servers (including computers and/or servers that are remotely located with respect to computer system 700).

Memory 724 may also include multiple program modules (or sets of instructions), including: data-storage management module 730 (or a set of instructions), performance monitor 732 (or a set of instructions), applications 742 (or sets of instructions), and/or drivers 744 (or sets of instructions). Note that one or more of these program modules (or sets of instructions) may constitute a computer-program mechanism.

Figure 8:
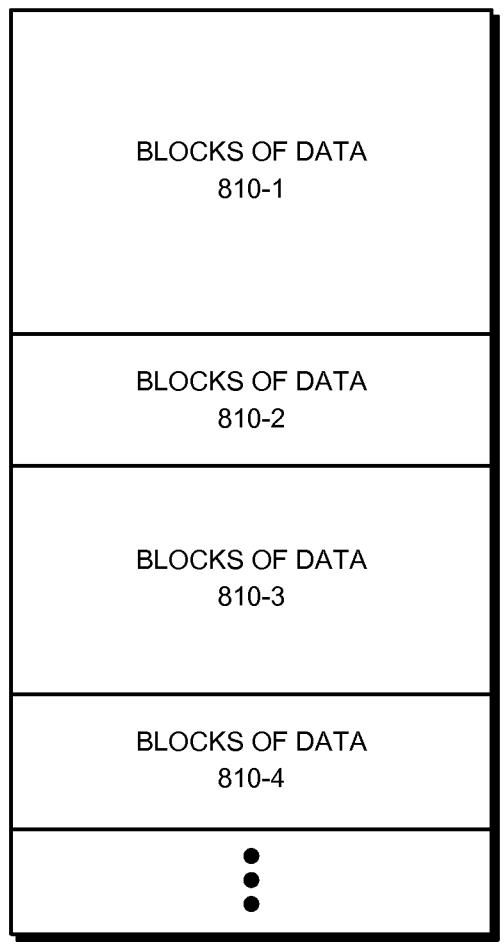
FIG. 8 is a block diagram of an address space, which is associated with a file system, for use in the computer system in FIG. 7 in accordance with an embodiment of the present disclosure.

During operation of computer system 700, data-storage management module 730 may generate one or more disposition instructions 748 which are associated with access commands directed to blocks of data at logical addresses 740 in an address space that is associated with a file system 738. For example, a disposition instruction may be generated based on one or more performance characteristics 746 of different types of memory in memory system 708. FIG. 8 presents a block diagram of an address space 800 with blocks of data 810 for files that are associated with a file system.

Referring back to FIG. 7, a disposition instruction may be generated based on one or more characteristics of one or more applications 742 and/or drivers 744. For example, the one or more characteristics may include core services, such as fonts, that are provided by operating system 726 for an application. In this case, the fonts may be moved to flash memory from an HDD in memory system 708 to improve the performance of the application. More generally, awareness of the different performance characteristics of the different types of memory in hardware and software (such as drivers 744, file system 738 and/or operating system 726) may be used to generate disposition instructions 748, and thus to select or modify a characteristic of memory system 708 and/or computer system 700.

In some embodiments, a disposition instruction is generated based on performance information for different applications (or threads) 736 in activity history 734, which is collected by performance monitor 732. For example, a swap space of computer system 700, files that are accessed within a predetermined time interval by computer system 700 (such as less than 100 ms), and/or information used during a boot cycle of computer system 700 (such as sector 0 on the HDD) may be moved to the flash memory. Similarly, data that is used infrequently may be moved to the HDD. In this way, the disposition instruction may move data in memory system 708 to obtain improved I/O performance, power consumption, etc., when one or more applications 736 are executed by the one or more processors 710.

As noted previously, the access commands may include read commands and write commands. Furthermore, a disposition instruction may include an explicit command to move or copy a block of data having a logical address to a different type of memory, or may include an optional suggestion to move or copy the block of data having the logical address to the different type of memory. If the block of data is moved, the logical address in file system 738 may be re-mapped. Alternatively, if the block of data is copied, a pointer in the address space may indicate that the logical address is associated with two or more different types of memory and/or different memory devices.

Furthermore, in some embodiments a disposition instruction is used to define an operating mode of memory system 708 for multiple subsequent access commands. In these embodiments, the disposition instruction may be based on one or more global parameters 750, such as power consumption of memory system 708 and/or computer system 700. Thus, the disposition instruction may be used to migrate the data in memory system 708 so that power consumption can be reduced. For example, by moving the blocks of data, the HDD and/or the flash memory may be turned off or placed into a low power-consumption state while one or more applications 742, processes and/or threads are executed by computer system 700.

Additionally, in some embodiments disposition instructions 748 are generated based on detailed data-disposition information that is provided by memory system 708, such as page table 752 or a TLB in the one or more processors 710. However, in other embodiment disposition instructions 748 are generated using limited storage information (such as utilization of the types of memory) or without storage information (in which case, disposition instructions 748 may include suggestions as opposed to specific data-management commands).

Instructions in the various modules in memory 724 may be implemented in: a high-level procedural language, an object-oriented programming language, and/or in an assembly or machine language. Note that the programming language may be compiled or interpreted, e.g., configurable or configured, to be executed by the one or more processors 710.

Although computer system 700 is illustrated as having a number of discrete components, FIG. 7 is intended to be a functional description of the various features that may be present in computer system 700 rather than a structural schematic of the embodiments described herein. In practice, and as recognized by those of ordinary skill in the art, the functions of computer system 700 may be distributed over a large number of servers or computers, with various groups of the servers or computers performing particular subsets of the functions. For example, computer system 700 may include a cloud computing system or a client-server computing system.

Furthermore, in some embodiments system 100 (FIG. 1), system 200 (FIG. 2), computer system 700 and/or address space 800 (FIG. 8) include fewer or additional components. For example, some or all of the functions of memory controller 210 may be implemented in processors 110. (Thus, in some embodiments the memory system may not include a memory controller.) Moreover, two or more components may be combined into a single component and/or a position of one or more components may be changed. Note that in some embodiments the functionality of computer system 700 may be implemented more in hardware and less in software, or less in hardware and more in software, as is known in the art. In some embodiments, some or all of the functionality of computer system 700 is implemented in one or more application-specific integrated circuits (ASICs) and/or one or more digital signal processors (DSPs).

While the preceding discussion used HDD 124 (FIGS. 1 and 2), flash memory 126 (FIGS. 1 and 2) and DRAM 128 (FIGS. 1 and 2) as illustrative examples, in other embodiments memory systems 122 (FIGS. 1 and 2) can include a wide variety of memory devices and components, such as: a removable media drive, magnetic tape, a semiconductor memory (for example, RAM, ROM, EPROM, EEPROM, etc.), a hybrid storage device, a solid-state memory, an optical storage device (for example, a holographic storage device, a CD-ROM, a digital versatile disc or digital video disc, an electro-optic storage device, etc.), and/or another memory that stores information at least temporarily.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A memory controller, comprising:
an interface circuit configured to receive a disposition instruction and an associated access command directed to a block of data at a logical address in a memory system managed by the memory controller, wherein the memory system includes a plurality of different types of memory having different performance characteristics, and wherein the disposition instruction is generated based on the different performance characteristics of the plurality of different types of memory; and
control logic, coupled to the interface circuit, which is configured to control accesses to the memory system, wherein the control logic is configured to receive the access command and, in response to the access command, is configured to forward the access command to a first type of memory in the plurality of different types of memory; and
wherein the control logic is also configured to receive the disposition instruction associated with the access command and, in response to the disposition instruction, is configured to move the block of data to a second type of memory in the plurality different types of memory to facilitate subsequent accesses to the block of data by providing a read command for the block of data to the first type of memory and a write command for the block of data to the second type of memory.

2. The memory controller of claim 1, wherein the access command includes a read command or a write command.

3. The memory controller of claim 1, wherein the disposition instruction is generated based on characteristics of a file system in the computer system.

4. The memory controller of claim 1, wherein the disposition instruction is generated based on a power state of the computer system.

5. The memory controller of claim 1, wherein the disposition instruction is generated based on characteristics of an application executed by the computer system.

6. The memory controller of claim 1, wherein the different performance characteristics include differing power consumptions of the different types of memory.

7. The memory controller of claim 1, wherein the different performance characteristics include different data rates of the different types of memory.

8. The memory controller of claim 1, wherein the control logic is configured to receive the disposition instruction included in the access command.

9. The memory controller of claim 1, wherein the control logic is configured to receive the disposition instruction interleaved between access commands.

10. The memory controller of claim 1, wherein the memory controller is configured to provide storage-utilization information for the different types of memory to a computer system.

11. The memory controller of claim 1, wherein the memory controller is configured to provide disposition information for the block of data to a computer system.

12. A method for moving a block of data, comprising:
receiving a disposition instruction and an associated access command directed to a block of data at a logical address in a memory system, wherein the memory system includes a plurality of different types of memory having different performance characteristics, and wherein the disposition instruction is generated based on the different performance characteristics of the plurality of different types of memory;
in response to the access command, accessing the block of data at the logical address in a first type of memory in the plurality of different types of memory by forwarding the access command to the first type of memory; and
in response to the disposition instruction, moving the block of data to a second type of memory in the different types of memory to facilitate subsequent accesses to the block of data by providing a read command for the block of data to the first type of memory and a write command for the block of data to the second type of memory.

13. The method of claim 12, wherein the access command includes a read command or a write command.

14. The method of claim 12, wherein the disposition instruction is generated based on characteristics of a file system in the computer system.

15. The method of claim 12, wherein the disposition instruction is generated based on a power state of the computer system.

16. The method of claim 12, wherein the disposition instruction is generated based on characteristics of an application executed by the computer system.

17. The method of claim 12, wherein the different performance characteristics include differing power consumptions of the different types of memory.

18. The method of claim 12, wherein the different performance characteristics include different data rates of the different types of memory.

19. The method of claim 12, wherein the disposition instruction is included in the access command.

20. The method of claim 12, wherein the disposition instruction is interleaved between access commands.

21. The method of claim 12 further comprising:
providing storage-utilization information for the different types of memory to a computer system.

22. The method of claim 12 further comprising:
providing disposition information for the block of data to a computer system.

* * * * *